O. SCHUMANN.
DEVICE FOR STRAINING WASTE WATER.
APPLICATION FILED JULY 18, 1908.

914,758.

Patented Mar. 9, 1909.

Witnesses:

Inventor:
OTTO SCHUMANN,
by
Attorney.

UNITED STATES PATENT OFFICE.

OTTO SCHUMANN, OF DRESDEN, GERMANY.

DEVICE FOR STRAINING WASTE WATER.

No. 914,758.   Specification of Letters Patent.   Patented March 9, 1909.

Application filed July 18, 1908. Serial No. 444,233.

*To all whom it may concern:*

Be it known that I, OTTO SCHUMANN, a citizen of the German Empire, and resident of Dresden A, Saxony, German Empire, have invented new and useful Improved Devices for Straining Waste Water, of which the following is a description.

The present invention relates to rotary filter sieves or screens for straining and purifying waste water and its object is to so arrange the screen or strainer that the greater part of its area shall be immersed in the water to be strained, thus rendering the sieve more effective and also tending to sort the filterings according to their specific gravity. These objects are attained by making the sieve of a conical shape or substantially conical and mounting it on an axis or shaft inclined toward the onflowing waste water, sewage or the like.

In order to render the present specification easily intelligible reference is had to the accompanying drawing in which similar letters of reference denote similar parts throughout the several views:—

Figure 1:
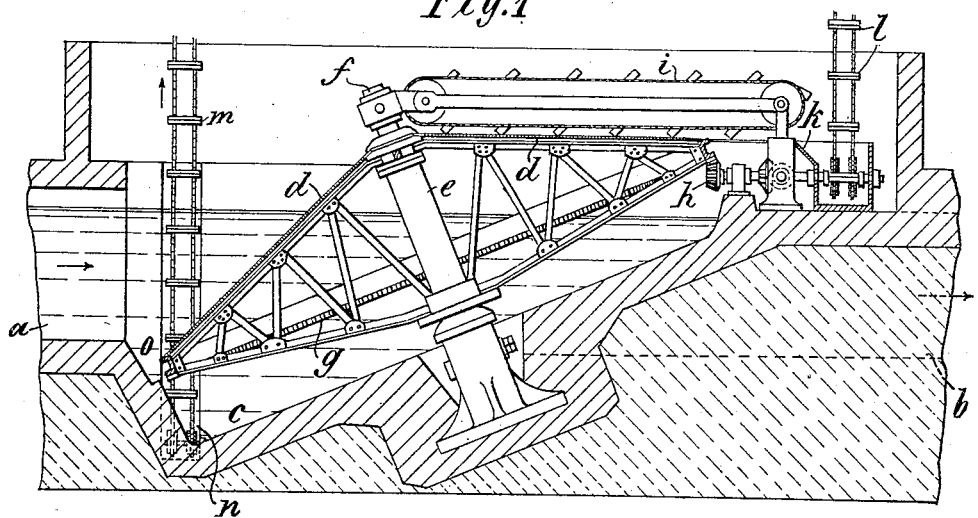
Figure 2:
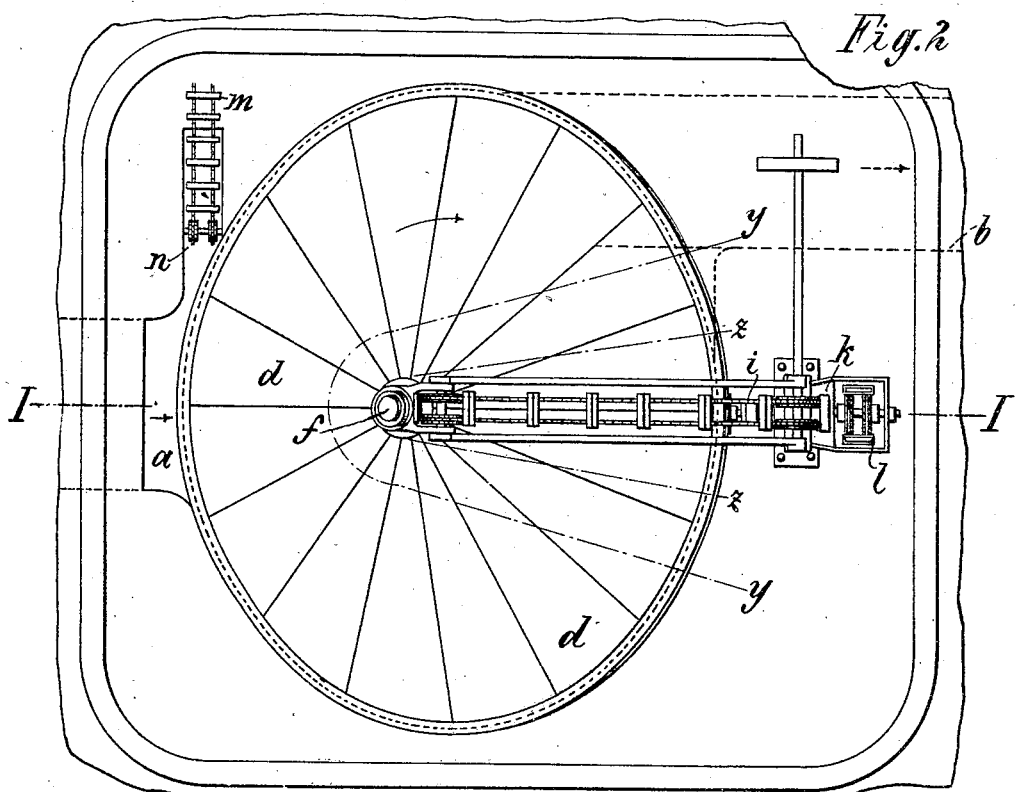

Figure 1 is a central vertical longitudinal section through the apparatus and Fig. 2 is a plan view of the same.

The waste water sewage or the like flows into the pit $c$ at the inflow $a$ and passing through the screen $d$ passes out of the pit at $b$. The screen $d$ is substantially conical in form and is mounted on the inclined shaft $e$ in such manner that the highest section of its surface shall be in a plane just above the level of the water. As shown in the drawings the surface of the screen which is above the water is represented by the line $y$ $y$, but it might be much smaller as indicated by the line $z z$ (Fig. 2). The screen is provided with a rim of teeth $g$ by means of which it is rotated by suitable gearing and the pinion $h$. Along the surface which extends out of the water suitable means are mounted for clearing away the impurities strained out of the water. In the drawing a chain of buckets $i$ is represented, which may be moved radially along the conical screen and will transport the impurities off the same on to the inclined surface $k$, which passes them on to the vertically moving bucket chain $l$ or any other suitable device.

At the bottom of the housing a scum or mud pit $n$ is laterally disposed, into which the heavier impurities will be forced by the rotation of the screen, and into which furthermore a vertical elevator or bucket chain $m$ extends for raising the contents of the same.

The shape and disposition of the conical screen of the present invention enables practically the whole of the sieve to be immersed, while it has the additional advantage that the surface which meets the oncoming water is most sharply inclined. This results in a sorting of the impurities strained off according to their specific gravity, the very heavy parts being pushed into the mud pit by the rotation of the screen and the other parts being disposed farther from or nearer to the center of the latter according as to whether they are of a heavier or lighter nature, the heavier parts lying toward the edges or circumference of the screen.

In the drawings I have illustrated an embodiment of the invention, but this arrangement could be varied in many ways without departing from the spirit of the invention. It will be readily understood that the surface of the screen extending out of the water need not be necessarily absolutely parallel to the surface of the water.

I claim as my invention:—

1. In a device for straining waste water and the like, the combination of a suitable pit having waste water inlet and strained water outlet, a conical screen, an inclined axis on which the said screen is mounted to rotate, the said screen having its uppermost surface substantially parallel with the water level and extending out of the same.

2. In a device for straining waste water and the like, the combination of a suitable pit having waste water inlet, and strained water outlet, a conical screen an inclined axis on which the said screen is mounted to rotate, the said screen having its uppermost surface substantially parallel with the water level and extending out of the same, and means for removing impurities from the part of the screen extending out of the water.

3. In a device for straining waste water and the like, the combination of a suitable pit having waste water inlet and strained water outlet, a conical screen an inclined axis on which the said screen is mounted to rotate, the said screen having its uppermost surface substantially parallel with the water level and extending out of the same, means for removing impurities from the part of the screen extending out of the water, a scum pit formed at the lowest point of the screen pit, laterally of the screen and means for removing the impurities therefrom.

In testimony whereof I affix my signature in the presence of two witnesses.

OTTO SCHUMANN.

Witnesses:
 RICHARD IFFERTE,
 PAUL LIENEMANN.